United States Patent
Wymore

(10) Patent No.: US 11,535,313 B2
(45) Date of Patent: Dec. 27, 2022

(54) SPARE TIRE MOUNT FOR MOTOR VEHICLE

(71) Applicant: NAADE, Inc., Brea, CA (US)

(72) Inventor: Timothy J. Wymore, Brea, CA (US)

(73) Assignee: NAADE, INC., Laredo, TX (US)

( * ) Notice: Subject to any disclaimer, the term of this patent is extended or adjusted under 35 U.S.C. 154(b) by 0 days.

(21) Appl. No.: 17/200,191

(22) Filed: Mar. 12, 2021

(65) Prior Publication Data

US 2021/0197904 A1 Jul. 1, 2021

Related U.S. Application Data

(63) Continuation of application No. 16/861,129, filed on Apr. 28, 2020, now Pat. No. 10,974,776, which is a continuation of application No. 16/169,347, filed on Oct. 24, 2018, now Pat. No. 10,661,845.

(60) Provisional application No. 62/578,205, filed on Oct. 27, 2017.

(51) Int. Cl.
*B62D 43/00* (2006.01)
*B62D 43/02* (2006.01)

(52) U.S. Cl.
CPC .......... *B62D 43/002* (2013.01); *B62D 43/02* (2013.01)

(58) Field of Classification Search
CPC ...... B62D 43/02; B62D 43/002; B62D 43/00; B60R 9/06; B60R 2011/0087; B60R 19/48
See application file for complete search history.

(56) References Cited

U.S. PATENT DOCUMENTS

| | | | | |
|---|---|---|---|---|
| 1,718,205 A | * | 6/1929 | McNear | B60R 9/06 224/524 |
| 2,348,811 A | * | 5/1944 | Hartman | B62D 43/002 414/466 |
| 2,386,261 A | * | 10/1945 | Redmond | B23K 11/31 208/251 R |
| 3,613,972 A | * | 10/1971 | Daughhetee | B62D 43/08 224/42.24 |
| 3,753,520 A | | 8/1973 | Bodde | |

(Continued)

OTHER PUBLICATIONS

Quadratec, Teraflex 4838130 HD Adjustable Spare Tire Mounting Kit for 2007-2018 Jeep Wrangler JK, web page <https://www.quadratec.com/products/12226_2020_07.htm?gclid=EAlaIQobCHMlkrb9mYvY4AlVFcNkCh2WAQ41EAkYESABE-glfNfD_BwE>, 5 pages, Feb. 25, 2019.

(Continued)

*Primary Examiner* — Brian D Nash
(74) *Attorney, Agent, or Firm* — Stetina Brunda Garred and Brucker

(57) ABSTRACT

A spare tire mount for the rear of a motor vehicle has a first outer support frame with a second, inner support frame nested inside and releasably connected to the first frame. Both frames extend laterally across the back of the vehicle and extend upward at an angle. Both frames rotate about a vertical joint at the rear bumper so the frames rotate toward and away from the vehicle. The second frame holds the spare tire and rotates about a horizontal axis. A wire rope winds around a reel on the first frame with the rope connected to the second frame to raise and lower the second frame and tire as they rotate about the first horizontal axis—toward and away from the first frame and ground. The reel is rotated by a worm screw and worm wheel.

6 Claims, 8 Drawing Sheets

(56) References Cited

U.S. PATENT DOCUMENTS

| | | | | |
|---|---|---|---|---|
| 3,845,891 | A | * | 11/1974 | Becher ............... B62D 43/02 |
| | | | | 224/42.21 |
| 4,212,417 | A | * | 7/1980 | Scott ................. B62D 43/08 |
| | | | | 414/466 |
| 4,278,191 | A | | 7/1981 | Mecham |
| 4,312,620 | A | * | 1/1982 | Muschalek, Jr. ....... B62D 43/04 |
| | | | | 414/466 |
| 4,410,117 | A | * | 10/1983 | Crawford ............. B62D 43/02 |
| | | | | 414/466 |
| 4,434,919 | A | | 3/1984 | Flowers |
| 4,679,717 | A | * | 7/1987 | Hansen ............... B62D 43/02 |
| | | | | 224/512 |
| 4,817,834 | A | | 4/1989 | Weiler |
| 4,844,528 | A | * | 7/1989 | Johnson .............. B60R 9/065 |
| | | | | 280/769 |
| 4,993,610 | A | | 2/1991 | Abretske et al. |
| 5,020,707 | A | | 6/1991 | Nozel et al. |
| 5,094,374 | A | | 3/1992 | Lee |
| 5,104,015 | A | | 4/1992 | Johnson |
| 5,186,371 | A | | 2/1993 | Jozefczak et al. |
| 5,538,168 | A | | 7/1996 | Burger et al. |
| 5,664,717 | A | | 9/1997 | Joder |
| 5,791,533 | A | | 8/1998 | Neag et al. |
| 5,806,736 | A | | 9/1998 | Kincart |
| 6,189,748 | B1 | | 2/2001 | Hutter et al. |
| 6,659,318 | B2 | | 12/2003 | Newbill |
| 6,701,913 | B1 | | 3/2004 | LeDuc et al. |
| 10,661,845 | B2 | | 5/2020 | Wymore |
| 2002/0084298 | A1 | | 7/2002 | Essig |
| 2003/0024958 | A1 | | 2/2003 | Slovick |
| 2004/0079774 | A1 | | 4/2004 | Roehmer et al. |
| 2004/0079778 | A1 | | 4/2004 | Wilkens |
| 2004/0222261 | A1 | | 11/2004 | Wilson |
| 2005/0077327 | A1 | | 4/2005 | Kenney |
| 2006/0102666 | A1 | | 5/2006 | Godding |
| 2009/0001109 | A1 | | 1/2009 | Wilkins |
| 2009/0047108 | A1 | | 2/2009 | Barie et al. |
| 2014/0271067 | A1 | | 9/2014 | Rossi |
| 2016/0236729 | A1 | | 8/2016 | Jorgensen |
| 2019/0100258 | A1 | | 4/2019 | Cherry et al. |
| 2019/0100259 | A1 | | 4/2019 | Cherry et al. |
| 2019/0126840 | A1 | | 5/2019 | Grossaint |
| 2019/0126997 | A1 | | 5/2019 | Wymore |
| 2019/0275929 | A1 | | 9/2019 | Glickman et al. |

OTHER PUBLICATIONS

Quadratec, Go Industries 94202 Slant Spare Tire Mount for 2007-2018 Jeep Wrangler JK, web page <https://www.quadratec.com/products/12154_0102_07.htm?gclid=EAIaIQobChMlgePRk43Y4AIVF6rsCh3cqgs-EAkYAiAPBgKplfD_BwE>, 4 pages, Feb. 25, 2019.

autotrucktoys.com, Aries Off-Road Jeep Wrangler Heavy-Duty Swing Away Spare Tire Carrier, web page <https://www.autotrucktoys.com/p/aries-off-road-jeep-wrangler-heavy-duty-swing-away-spare-tire-carrier/?psid=104478&gclid=EAIaIQobChMl0On9jo7Y4AIVFiCtBh33kwKrEAQYASABEgK-DPD_BwE>, 4 pages, Feb. 25, 2019.

Google Express, Aries 2563000 Jeep Heavy-Duty Spare Tire Carrier, web page <https://express.google.com/u/0/product/3743760666511182580_12441530435907274472_108310290?utm_source=google_shopping&utm_medium=tu_prop&utm_content=eid-1sjeuxoeqt>im=CPuOse-_zMfxchDNo52C7q_GzyYYwLbPqQEiA1VTRCigsPfjBTCS3tlz&utm_campaign=108310290&gclid=EAIaIQobChMl05q05o7Y4AIVCcZkCh0jYgQmEAkYASABEgLHp_D_BwE>, 2 pages, Feb. 25, 2019.

* cited by examiner

SPARE TIRE MOUNT FOR MOTOR VEHICLE

CROSS-REFERENCE TO RELATED APPLICATIONS

This application is a continuation of U.S. application Ser. No. 16/861,129, filed Apr. 28, 2020, which is a continuation of U.S. application Ser. No. 16/169,347, filed Oct. 24, 2018, now U.S. Pat. No. 10,661,845, issued May 26, 2020, which claims the benefit of U.S. Application Ser. No. 62/578,205, filed Oct. 27, 2017, the contents of which are expressly incorporated herein by reference.

STATEMENT RE: FEDERALLY SPONSORED RESEARCH/DEVELOPMENT

Not applicable.

BACKGROUND

Motor vehicles designed for off-road use include the Jeep® brand motor vehicle which may have a spare tire mounted to the back door of the vehicle. But the spare tire and wheel are heavy that this increases the weight on the door and may make it difficult to open the door. There is thus a need for an improved way to carry a spare tire without so much weight on the rear door of the vehicle.

Also, if the vehicle owner changes wheels or tires on the vehicle to use larger wheels and/or tires, it may be difficult or impossible to mount a matching spare tire on the vehicle door because the wheel mounting holes on the wheel may cause the tire to hit the back door before the wheel meets the mounting plate. There is thus a need for an improved way to mount a spare tire and wheels of various sizes to the back of a vehicle.

Further, the spare tire and wheel are heavy. A user may have difficulty physically removing the heavy wheel and tire from the door mount, and setting the wheel and spare tire on the ground. Dropping the wheel and tire from the height of the spare tire mount may cause injury or damage because the spare tire will bounce and may hit and damage the vehicle or other property or may hit and injure others. Likewise, mounting a tire (even if flat) on the standard mounting plate requires lifting the wheel and tire to the elevated plate and fitting bolts on the mounting plate through holes in the wheel—and that may be physically difficult—especially for larger wheels and tires. There is thus a need for an improved way to remove wheels and tires from the elevated spare tire mount on the back of the vehicle, and a further need for an improved way to mount spare wheels and tires on an elevated spare tire mount on the back of a vehicle.

BRIEF SUMMARY

A spare tire mount for the rear of a motor vehicle has a first outer support frame with a second, inner support frame nested inside and releasably connected to the first frame. Both frames extend laterally across the back of the vehicle and extend upward at an angle. Both frames rotate about a vertical joint at the rear bumper so the frames rotate toward and away from the vehicle. The second frame holds the spare tire and rotates about a horizontal axis. A wire rope winds around a reel on the first frame with the rope connected to the second frame to raise and lower the second frame and tire as they rotate about the first horizontal axis—toward and away from the first frame and ground. The reel is rotated by a worm screw and worm wheel. The vertical joint is offset from the vertical hinge axis of the vehicle's rear door, so the spare tire mounting mechanism can rotate separate from the vehicle's rear door. Or the spare tire mounting mechanism can be linked to the door by an adjustable length swivel linkage so the rear door and tire mounting mechanism rotate together, but about different vertical axes, with the swivel linkage accommodating the different movement caused by the different rotational axes.

A first summarized spare tire mounting mechanism for the rear of a motor vehicle is provided where the vehicle has a rear door hinged at a first side of the vehicle to rotate about a first vertical axis. The spare tire mounting mechanism includes a first support frame having proximal and distal ends with a base at the proximal end. The base has opposing first and second ends with a first rotating joint at the first end rotating about a second vertical axis. The base has a second rotating joint at the second end rotating about a first horizontal axis. The second vertical axis is offset from the first vertical axis during use. The distal end of the first support frame extends upward from the second end of the base, preferably at an angle. The first and second ends of the base are offset from each other in the horizontal plane. The spare tire mounting mechanism also includes a second support frame having proximal and distal ends with its proximal end rotatably connected to the second rotating joint and rotating about the first horizontal axis. The distal end of the second support frame has a tire mount with a plurality of bolts located to engage the mounting holes of a vehicle wheel with the bolts centered around and parallel to a second horizontal axis parallel to and offset from the first horizontal axis. The second support frame is below the first support frame for a major portion of a length of the second support frame. The second support frame rotates about the first horizontal axis towards and away from the first support frame in a vertical plane orthogonal to the first horizontal axis, and during use rotates toward and away from the ground when the first and second frames are not latched together.

In further variations, the spare tire mounting mechanism has a first support frame with a rotatable reel and an elongated, flexible member. A first end of the flexible member is wound around the reel and a second end is connected to the second support frame so that winding the elongated flexible member around the reel draws the distal end of the second support frame toward the distal end of the first support frame. Unwinding the elongated flexible member from around the reel allows the distal end of the second support frame to move away from the distal end of the first support frame and toward the ground during use.

In further variations, the first and second vertical axes are offset from each other by a distance of about 1-5 inches in the horizontal plane. That offset allows a space between the back of the vehicle and the frames, both for access and to ensure the frames do not hit the vehicle during use. The offset on the first support frame may extend rearward a first distance of several inches during use. Moreover, a substantial portion of the distal end of the first support frame and a substantial portion of the second support frame may be in a common vertical plane as the support frames rotate about the second vertical axis, with a releasable latch mechanism holding the first and second support frames together during said rotation.

The reel is preferably rotated by a worm screw and mating worm wheel. One of the worm wheel and worm screw is preferably on a shaft having an engaging end having multiple flats. The engaging end may be rotated manually by a wrench, or it may be rotated by a power tool such as a portable drill.

The spare tire mounting mechanism may also include an adjustable length connecting link having a first end rotatably connected to the second support frame and a second end having an opening configured to engage a shaft connected to the motor vehicle during use. The spare tire mounting mechanism advantageously includes a brace extending from the second support frame where the brace has a recess configured to receive a mating stop on the motor vehicle during use. The recess is preferably formed of a UHMW material.

The spare tire mounting mechanism may also include an upwardly extending, adjustable length tube having a proximal end connected to the first support frame and a distal end extending above the first support frame, with a mounting surface on the distal end having at least one hole to mount a rear brake light of the motor vehicle during use. This provides a telescoping mount for a brake light, camera or other electronic device, or even a non-electric device such as a reflector.

The spare tire mounting mechanism advantageously includes an extendable or telescoping tube for the tire mount. The extendable tube may have a first tube with a proximal end mounted to the second support frame and an open distal end into which is inserted a plurality of sliding inserts on opposing sides of a second, extendable tube coaxial with the first tube. The extendable tube has a distal end connected to the plurality of bolts for the spare wheel and tire. The first and second tubes may have a plurality of aligned holes along a length of the first and second tubes and extending through opposing sides of the first and second tubes and through any intervening plastic inserts, so that a shaft may extend through the aligned holes in opposing sides of the first and second tubes to restrain relative movement of the first and second tubes of the tire mount. A fastening member may extend through the aligned holes in opposing sides of the first and second tubes. The distal end of the extendable tube may have a vertical plate from which the at least three bolts extend.

The first tube preferably has a plate at its proximal end with hole therein through which extends the shaft of a threaded fastener. The proximal end of the extendable tube has a threaded hole engaging the threaded fastener to adjust the relative positions of the first tube and extendable tube along a length of the threaded fastener.

The spare tire mounting mechanism may include a vehicle mounting bracket having at least one vertical plate with a plurality of bolt holes therethrough and a top mounting plate with at least one vertical bolt hole therethrough. Advantageously, a rear bumper is connected to the vehicle mounting bracket and further connected to the top mounting plate. The vehicle mounting bracket is connected to the first rotating joint. The first rotating joint advantageously comprises a steel pin in at least one bushing and at least one thrust bearing. The steel pin may extend downward into a socket in the vehicle mounting bracket. The steel pin may extend upward from the vehicle mounting bracket and into a socket in the first end of the base.

A second summarized spare tire mount for the rear of a motor vehicle is also used with a vehicle having a rear door hinged at a first side of the vehicle to rotate about a first vertical axis. The mounting mechanism includes a first outer support frame and a second, inner support frame nested inside and releasably connected to the first frame by a releasable latch mechanism. The first frame is connected to a first vertical joint that rotates about a vertical axis during use. The first and second frames each have a portion extending upward at an angle during use. The second frame is also connected to a horizontal joint on a base of the first frame so the second frame rotates about a first horizontal axis relative to the first frame. A reel is mounted to the first frame and rotated by a worm and worm wheel to wind and unwind a wire rope wound around the reel. The distal end of the wire rope is fastened to the second frame so winding and unwinding the rope around the reel moves the second frame. A tire mount is connected to the second frame and has bolts configured to fit through mounting holes of a vehicle wheel having a tire mounted thereon. In use, when the releasable latch is latched the first and second frames may rotate together about the first vertical axis. In use, when the releasable latch is unlatched the reel may rotate to unwind and the wire rope and the second frame and tire mount may rotate about the first horizontal axis away from the first frame and toward the ground. In use, when the releasable latch is unlatched the reel may wind up the wire rope and the second frame and tire mount may rotate about the first horizontal axis toward the first frame and away from the ground.

In further variations, an adjustable length swivel link is provided and has a first end rotatably connected to one of the first and second frames (preferably to the second frame) and a second end configured to receive a shaft to connect the link to the motor vehicle during use. The above variations to the first described vehicle mounting mechanism also apply to this second spare tire mounting mechanism.

BRIEF DESCRIPTION OF THE DRAWINGS

These and other advantages and features of the invention will be better appreciated in view of the following drawings and descriptions in which like numbers refer to like parts throughout, and in which.

DETAILED DESCRIPTION

As used herein, the following parts numbers generally refer to the following parts: 10—spare tire mounting system; 12—spare tire; 14—motor vehicle; 16—first support frame;

18—second support frame; 20—rear door; 22—connecting link; 24—rotatable joint; 26—releasable connector; 28—first vertical axis; 30—hinge; 32—second vertical axis; 34—latch; 36—first horizontal axis; 38—elongated flexible member; 40—reel; 50—vehicle mounting bracket; 52—rotating joint; 54—socket; 56—pin; 58—top mounting plate; 60—rear bumper; 62—horizontal rotating joint; 64—hook; 70—base; 74—intermediate portion; 76—distal end; 80*a, b*—pulleys; 82—gear; 84—worm screw; 86—opening in middle portion 74; 88—engaging end; 90—rotatable connection; 92—releasable fastener; 94—male projection for latch; 96—handle; 100—tubular base; 102—extendable support; 104—releasable fastening mechanism; 106—mounting bracket; 114—middle portion of second support frame; 116—distal end of second support frame; 117—strip of compressible material; 118—tire mount; 120—bolts; 122—axis of tire mount; 124—tire support; 126—outer tire support tube; 128—inner tire support tube; 130—plastic inserts; 132—holes; 134—locking fastener; 138—threaded fastener; 140—plate on inner tire support tub; 142—threaded hole; 144—plate on outer tire support tube; 146—hole in plate 144; 150—brace; 152—stop; 154—bracket; 156—panel; and 158—recess in brace.

Referring to FIGS. 1-8, as used herein, the relative directions front and rear, forward and backward, are with respect to the direction a driver of a motor vehicle faces during use when driving down a road. As the invention relates to a spare tire mounted off of the rear of a vehicle and above and beyond the rear bumper, the forward direction is also toward the rear of the vehicle when viewed from a location behind the vehicle. The vertical and horizontal directions are relative to the vehicle resting on a flat, horizontal surface. As used herein, the relative directions above and below, top and bottom, upper and lower are with respect to the direction of gravity and level, horizontal ground on which the motor vehicle rests, with down being in a direction toward the ground, and up being in a direction away from the ground and toward the sky. The lateral direction refers to the directions toward or away from the plane through the midline of the motor vehicle and between the front and rear wheels of the vehicle. As also used herein, the reference to "substantially" refers to a variation of 15% (plus or minus) and "majority" refers to over 50%.

Figure 1:
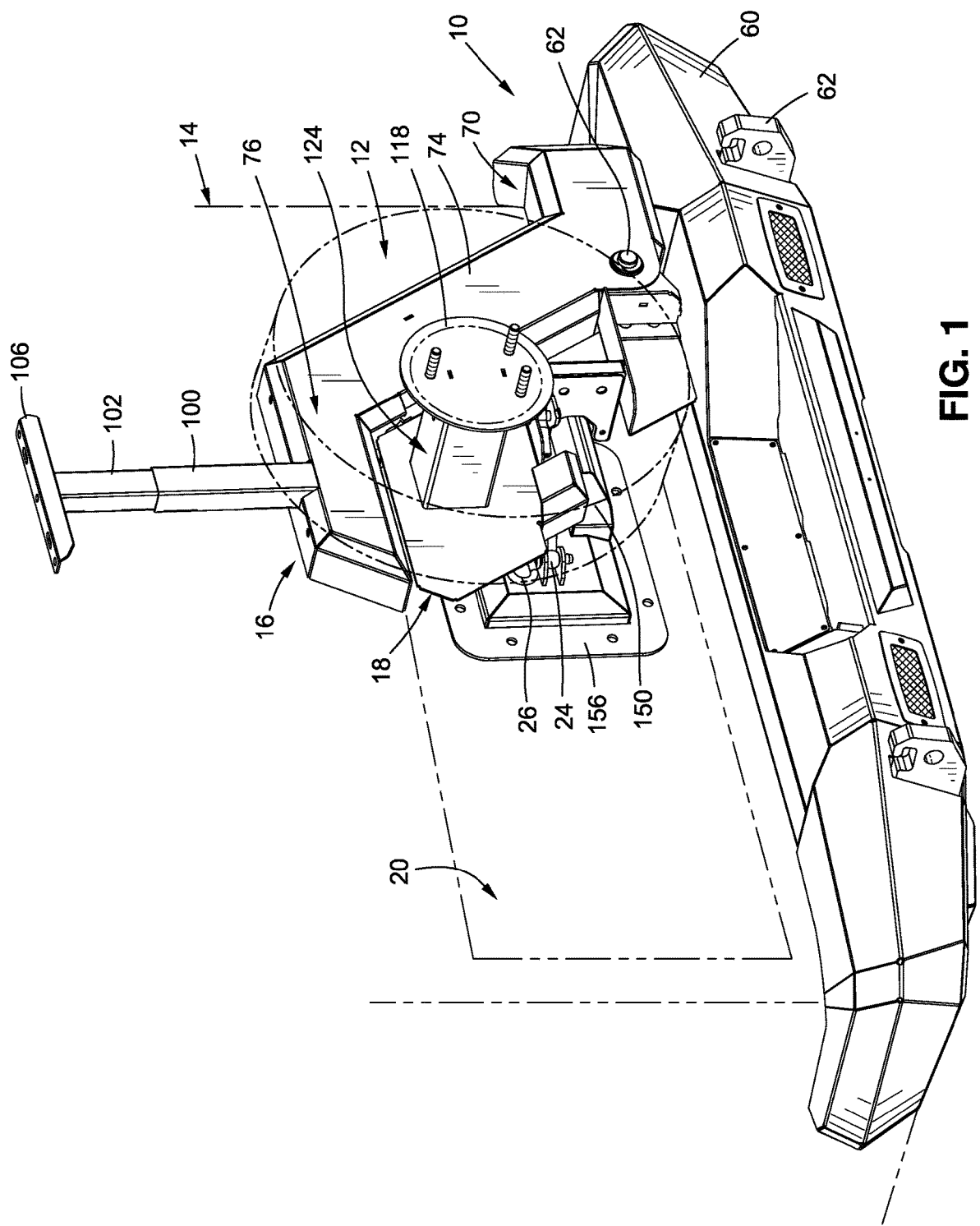
FIG. 1 is an exploded perspective view of a rear bumper and spare tire mount in a first, storage position on a motor vehicle with the spare tire in a storage position adjacent the back of the motor vehicle.
Figure 2:
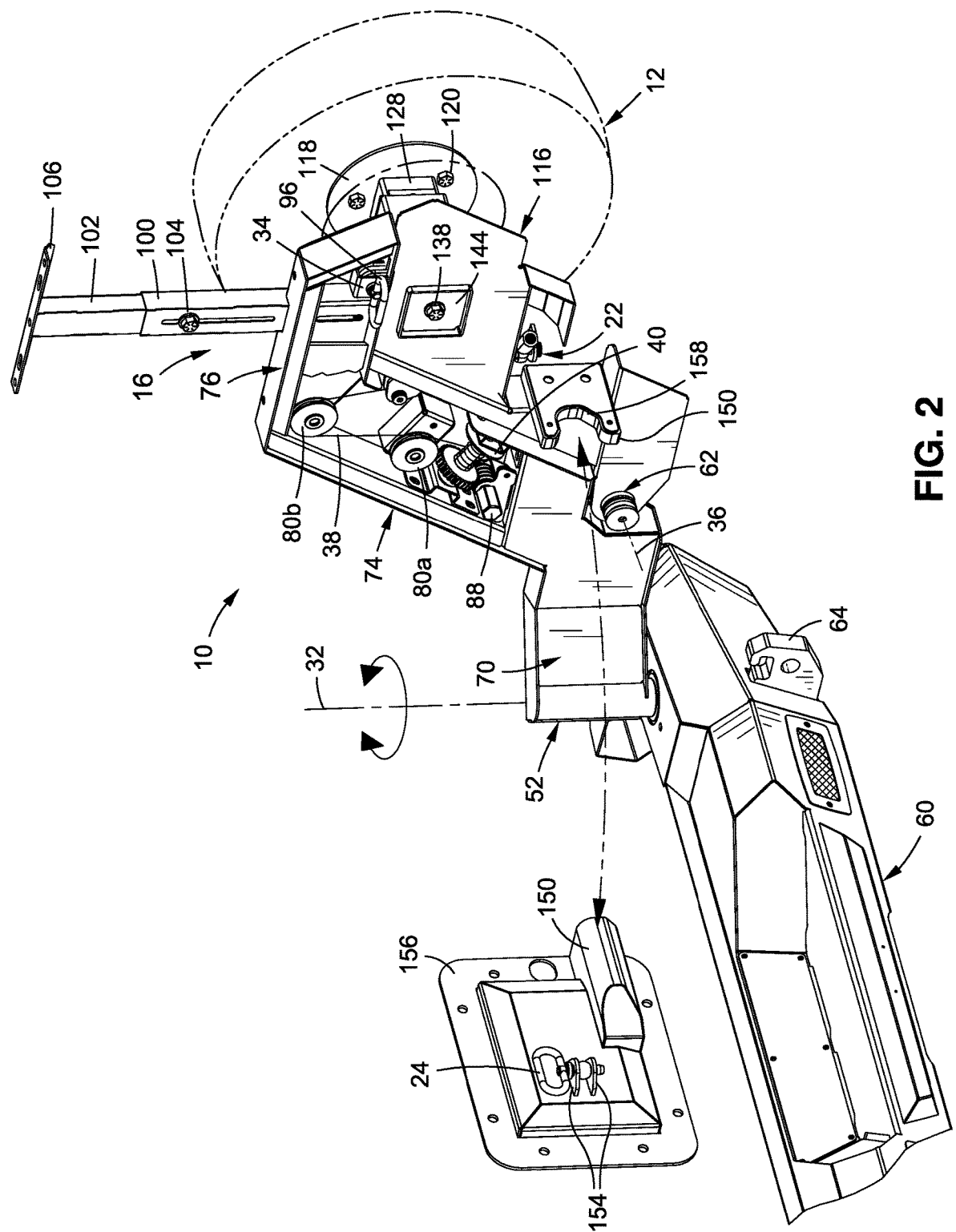
FIG. 2 is an exploded perspective view of the rear bumper and spare tire mount of FIG. 1 in a second, extended position away from the vehicle with the tire also in a second extended position away from the vehicle.
Figure 3:
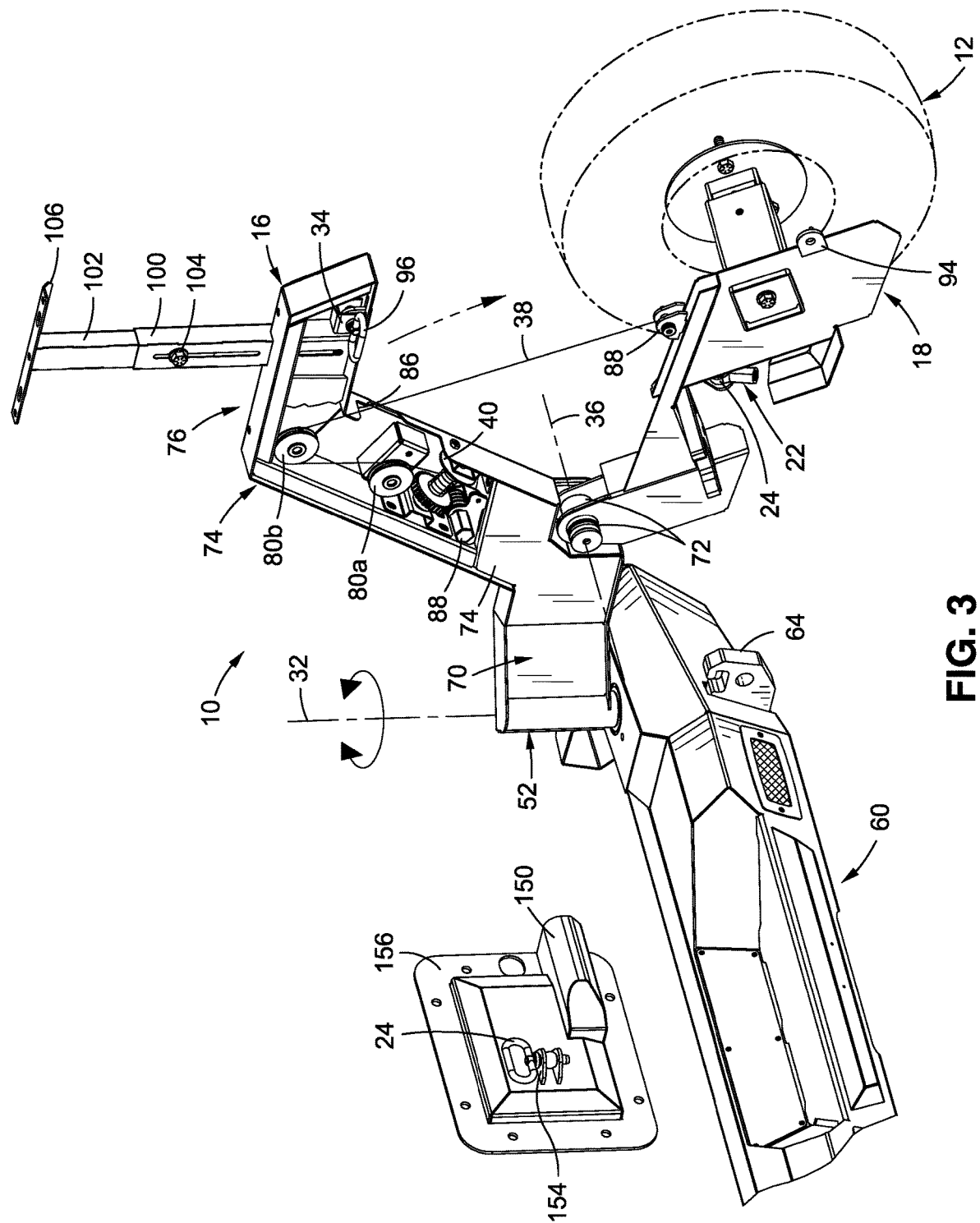
FIG. 3 is an exploded perspective view of the rear bumper and spare tire mount of FIG. 2 with the tire mount in a third, deployed position and with the tire in a third position that is extended toward the ground.

Referring to FIGS. 1-5, a spare tire mounting system 10 for mounting a spare tire 12 (in phantom lines) on a motor vehicle 14 (in phantom lines) is shown. The spare tire mounting system 10 allows the spare tire 12 to move from a first, stowed position adjacent the back of the motor vehicle 14 (FIG. 1), to a second, extended or deployed position away from the vehicle and preferably rotated at an angle of about 20° to about 230° from the stowed position (FIG. 2), and to further move to a third, dismounting position where the tire is on or within a few inches of the ground (FIG. 3).

The spare tire mounting system 10 includes a first support frame 16 and a second support frame 18 that are releasably held together with both support frames rotatably mounted to the motor vehicle 14, and with the second support frame 18 movable relative to the first support frame. One of the first and second support frames 16, 18 is releasably connected to the motor vehicle 14, preferably connected to a rotating rear door 20 (in phantom lines) of that motor vehicle by a connecting link 22 preferably taking the form of an adjustable length swivel bolt having a rotatable joint 24 on each opposing end of the connecting link 22. A hemispherical joint or hemi joint is believed suitable for the rotatable joint 24.

Figure 4:
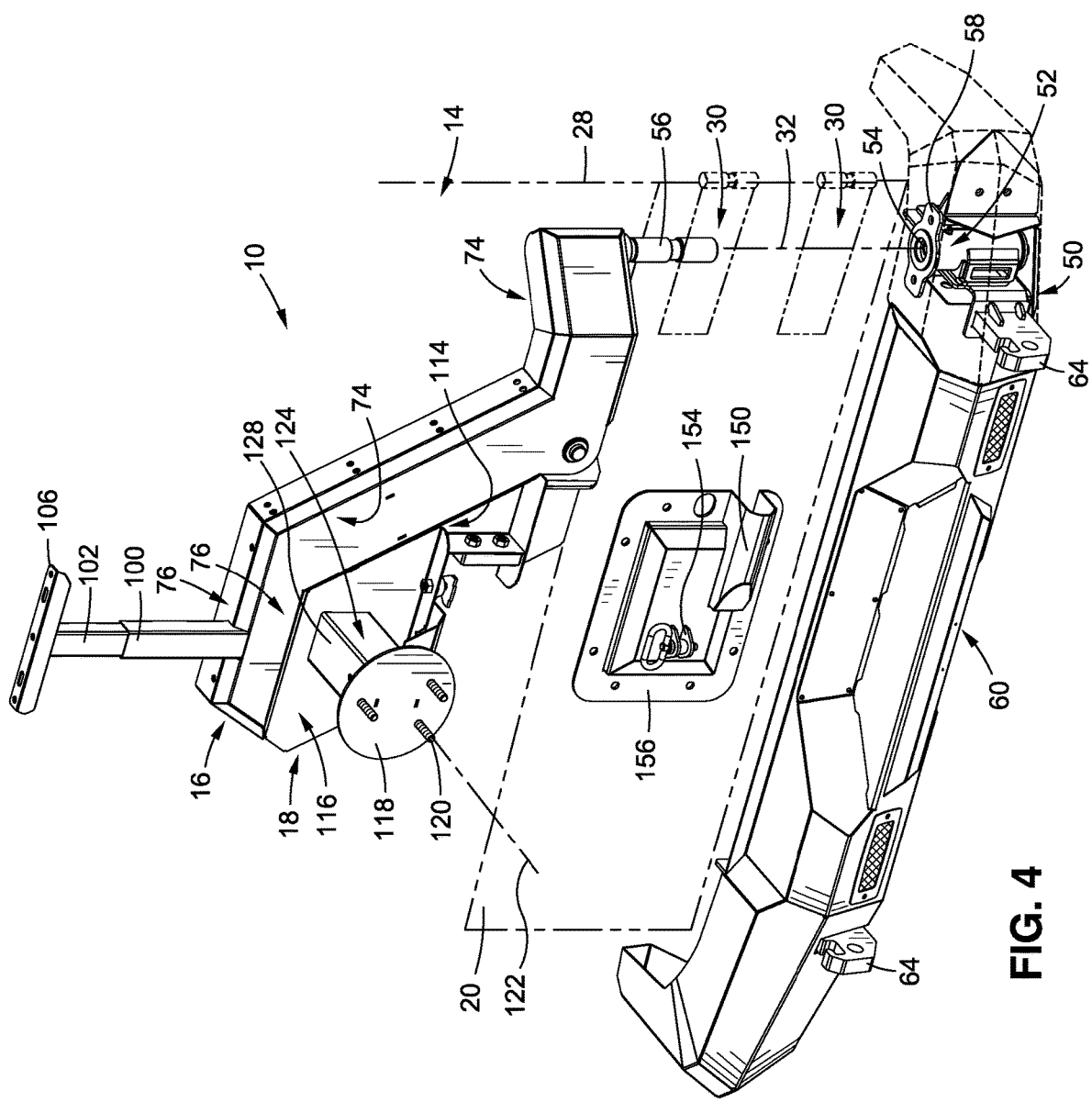
FIG. 4 is an exploded perspective view of the rear bumper and spare tire mount of FIG. 1 with a rear door of the vehicle in broken lines and part of the bumper removed to show the rotating connection to the bumper and vehicle frame.

The basic use of the spare tire mount is briefly described, beginning with the tire 12 in the first, stowed position of FIG. 1. A releasable connector 26 holds one end of the connecting link 22 to the vehicle 14 and preferably connecting to the rear door 20 which rotates horizontally about first vertical axis 28 (FIG. 4) on hinges 30 (FIG. 4). The opposing end of connecting link is connected to one of the first or second support frames 16, 18 and preferably connected to the second support frame 18. Preferably the connecting link is in a substantially horizontal plane and more preferably is substantially aligned with a longitudinal axis through the vehicle, between the vehicle's front and rear wheels. When the connecting link 22 is released by removing releasable connector 26, the first and second support frames 16, 18 may be manually rotated about second vertical axis 32 to move away from the vehicle 14 and into the second, deployed or extended position as shown in FIGS. 2-3. A latch 34 releasably connecting the first and second frames is released, allowing the second support frame to rotate about first horizontal axis 36 on the first support frame until the tire 12, which is releasably mounted on the second support frame, rests on the ground as in the third position of FIG. 3.

To further avoid having the tire fall freely to the ground while it is mounted on the second support frame 18, an elongated flexible member 38 such as a wire rope may be connected to and wound around reel 40 connected to the first support frame 16, with the distal end of the flexible member 38 connected to the second support frame 18. The rotation of the reel 40 moves the second support frame 18 and the tire 12 connected to that second support frame, toward and away from the first support frame and toward and away from the ground. The rotation of reel 40 is controlled by gearing that preferably prevents the weight of the tire 12 and second support frame from rotating the reel. Once the tire 12 rests on the ground or is near the ground it may be removed from its mount on the second support frame. Alternatively, the tire 12 may be connected to the second support frame 18 and moved into the storage position by rotating reel 40 and the second support frame, engaging latch 34 to connect the frames together, rotating the connected first and second support frames toward the vehicle and reconnecting the connecting link 22 to the vehicle 14.

When the connecting link 22 is engaged the vehicle rear door 20 is linked to and moves with the first and second support frames 16, 18—when the latch 34 is engaged so the frames move together. The frames 16, 18 are linked to the door 20 by the adjustable length swivel linkage 22 so the rear door and frames rotate together, but rotate about different vertical axes 28, 32. The swivel joints 24 at each end of the connecting link 22 accommodate the rotation about the two axes. By adjusting the length of the link 22, the distance between the frames 16, 18 and vehicle door 20 may be varied, and the tightness with which the flexible tire 12 is urged against the frames 16, 18 may be varied. The swivel joint 24 on the ends of link 22 provide multi-axis rotation, and each joint preferably rotates about three orthogonal axes. The swivel joints are referred to as a hemispherical joint.

Figure 5:
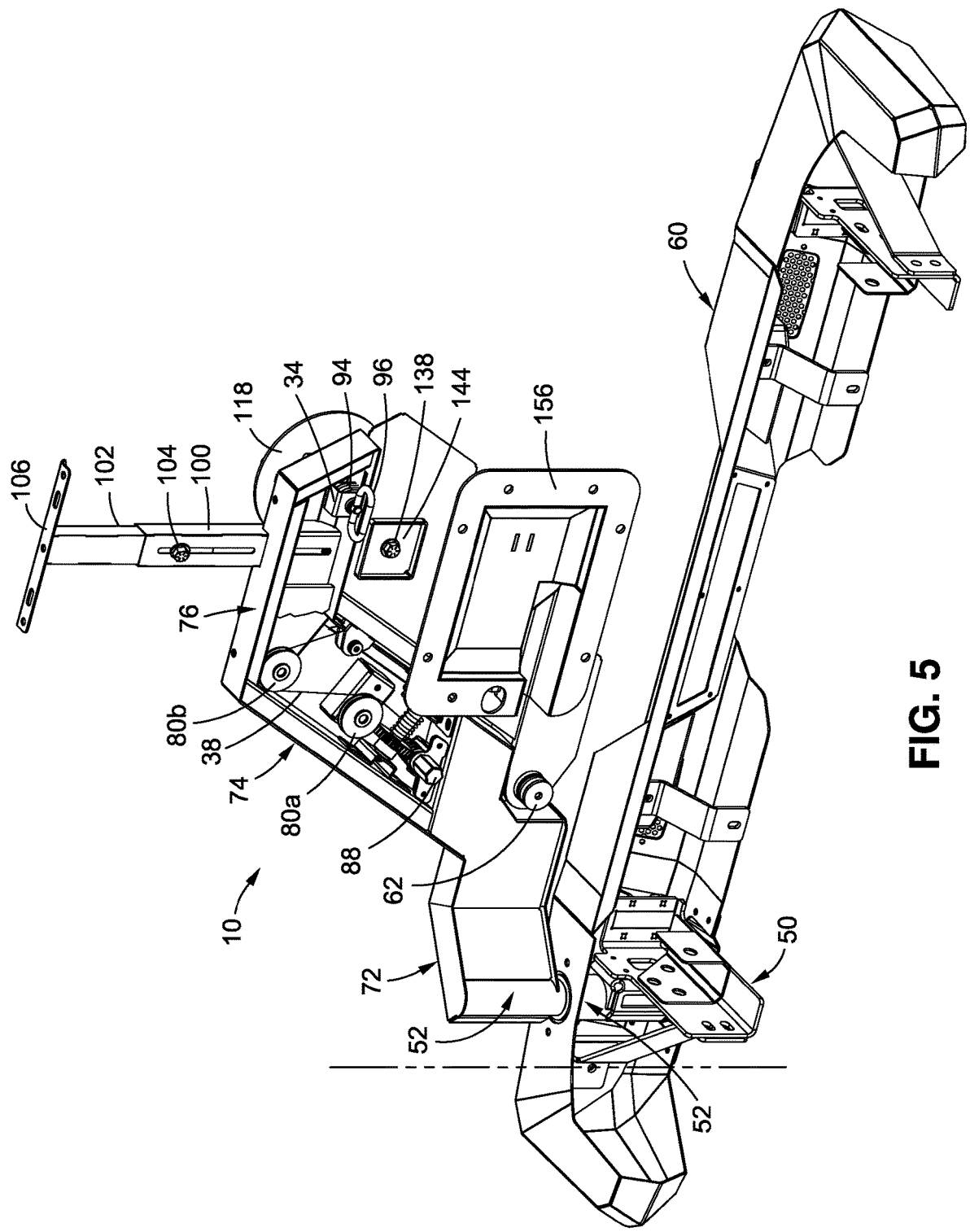
FIG. 5 is a perspective view of the rear bumper and spare tire mount of FIG. 1 from the vehicle side looking rearward.
Figure 6:
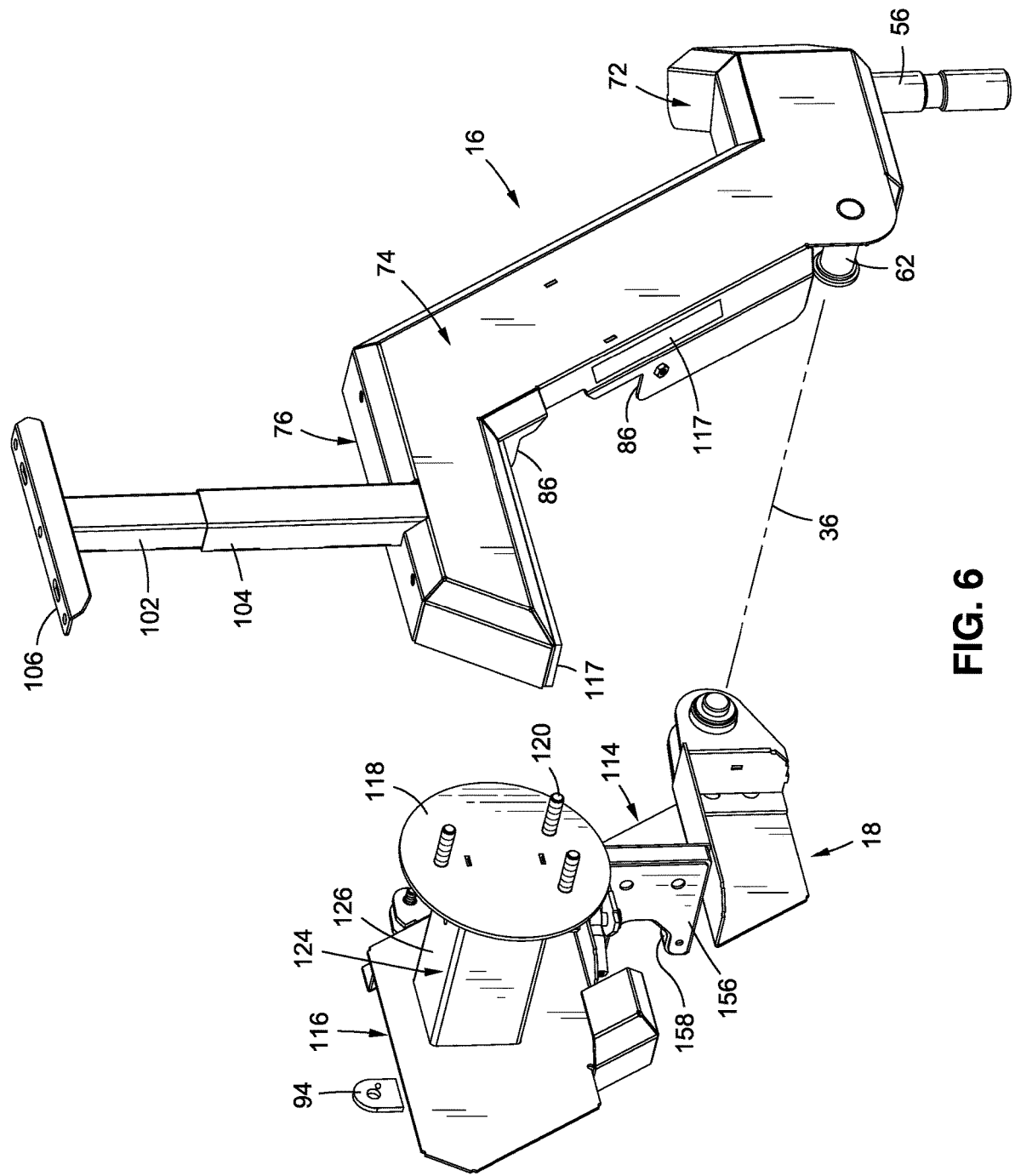
FIG. 6 is an exploded perspective view of first and second support frames of the spare tire mount of FIG. 1.

In more detail, and referring to FIGS. 1, 4 and 5, a vehicle mounting bracket 50 connects the first support frame 16 to a frame of the motor vehicle 14. The frames of motor vehicles 14 are typically rectangular in cross-section, with either a closed rectangular cross-section or an open, C-shaped cross section being commonly used. The vehicle mounting bracket 50 has at least one generally vertical plate with a plurality of holes through which bolts may pass horizontally to bolt the plate and bracket 50 to a vertical wall on the rear of the frame of vehicle 14. The vehicle mounting bracket may have a bottom plate or a second vertical plate either of which may also have one or more holes to allow those plates to be bolted to the frame of vehicle 14, as best seen in FIG. 5.

The vehicle mounting bracket 50 has a rotating joint 52 which allows rotation about second vertical axis 32. The rotating joint 52 is shown as a socket 54 (FIG. 5) receiving a pin 56 (FIG. 56) depending from the proximal end of the first support frame 16. Preferably, the socket 54 has brass bushings for rotation, and thrust bearings for vertical loads. More preferably, the socket 54 and joint 52 use two, three-inch long brass bushings with three thrust bearings, one of which is between the two bushings. The rotating joint 52 is sized to support the weight of the support frames 16, 18 and the wheel and tire mounted thereon. A two-inch diameter, steel pin 56 is believed suitable.

While the rotating joint 52 is shown as having the socket on the vehicle mounting bracket 50 and the pin 56 on the first support frame 16, the parts could be reversed, with the pin extending upward from the vehicle mounting bracket 50 and the socket in the distal end of the first support frame 16. The rotating joint 50 rotates about vertical axis 32, which is parallel to but offset laterally a few inches from the vertical hinge axis 28 about which the rear door 20 rotates as it opens and closes.

The vehicle mounting bracket 50 preferably has a top mounting plate 58 (FIG. 4) which not only encircles and connects to the joint 52 and socket 54, but has at least one and preferably two or three substantially horizontal portions having holes therethrough. Threaded fasteners may pass through these holes to bolt the top mounting plate 58 to the top of the vehicle's rear bumper 60. The top mounting plate 58 preferably abuts the inside of the bumper and is not seen from outside the vehicle. While the top mounting plate 58 is shown as a single, continuous plate, it may comprise a bracket with two or three separate, generally horizontal plates connected to the vehicle mounting bracket, and the term top mounting plate 58 as used herein encompasses such a construction using several separate mounting plates on a common support frame.

The top mounting plate provides a connection to the frame of the motor vehicle 14 in a plane that is orthogonal to the vertical axis 32 about which the joint 52 rotates. The connection of the top mounting plate 58 with the rear bumper 60 is also at a location spaced apart from the connection of the rotating joint 52 and the frame of vehicle 14 and that helps stabilize the joint 52. The top mounting plate 58 preferably connects to the top of the rear bumper 60 which faces upward and encircles the socket 54, but could connect to the rearward facing portion of the joint 52 and bumper 60 or connect to the laterally facing portions of the bumper and joint 52. As seen in FIG. 5, other support brackets may connect the vehicle mounting bracket 50 to the rear bumper 50. Advantageously, but optionally, a hook 64 may be connected to the rear end of the vehicle mounting bracket 50, with the hook extending through an opening in the bumper 60.

Referring to FIGS. 1-6 and 8, the first support frame 16 has opposing proximal and distal ends that are generally horizontal with an inclined intermediate or middle portion. The first, proximal end comprises base 70, which is connected to inclined middle portion 74 which is in turn connected to horizontal distal end 76. The base 70 has its proximal end connected to the joint rotating joint 52 which rotates about second vertical axis 32. The proximal end comprises a base 70 which has opposing first and second ends with the first, rotating joint 52 at a first end and rotating about the second vertical axis 32. The base 70 has an opposing, second end with a second rotating joint 62. The second rotating joint 62 rotates about the first horizontal axis 36 and connects to the second support frame 18 as discussed later.

The first and second ends of the base are offset from each other in the horizontal plane to form a bend extending away from the vehicle when in the first, storage position. When the first and second support frames 16, 18 are connected to the rear end of the motor vehicle as in FIG. 1, the frames 16, 18 are adjacent to the rear end of the motor vehicle 14, and the frames 16, 18 are generally in a vertical plane that is offset from the rear end of the motor vehicle by the bend in the base 70. Except for the rearward offset in the base 70, remainder of the first support frame 16 and all or substantially all of the second support frame 18, are in the same vertical plane. The frames 16, 18 could be slightly curved to conform to a curved rear end of a motor vehicle and if so curved would be within the meaning of vertical plane as used herein.

The joint 52 and its vertical axis of rotation 32 are intermediate or between the vertical plane through the first and second support frames 16 and the vertical plane through the rear of the motor vehicle 14 and axis 28 about which door 20 rotates. The offset is only a few inches, preferably about 1-5 inches. The vertical axis 32 is preferably about 1-4 inches from the adjacent rear door 20 of the motor vehicle 14 at the top of the rear bumper 60, measured in the horizontal plane, in the rearward direction.

The base 70 is preferably formed by an elongated, closed box section having a rectangular cross-section. The base 70 is made of metal, preferably steel, as are the other parts of the spare tire mounting system 10, including the first and second support frames 16, 18. The base 70 has opposing top and bottom sides that are generally horizontal.

A middle portion or intermediate portion 74 extends from the second end or distal end of the base 70 and extends upward at an angle of about 45°-55° from the horizontal (45°-15° from vertical) and preferably at an angle of about 60° from the horizontal (30° from vertical). The distal or upper end of the middle portion 74 is connected to the distal end 76 of the first support frame 16. The distal end 76 preferably extends horizontally from the distal end of the middle portion 74. Advantageously, the middle portion 74 and optionally the distal end 76 are closed, box sections preferably having a rectangular cross-section like that of the base 70. For ease of illustration, the figures have removed the inner side of the box-section to show a gear-driven reel inside the middle portion 74.

Figure 8:
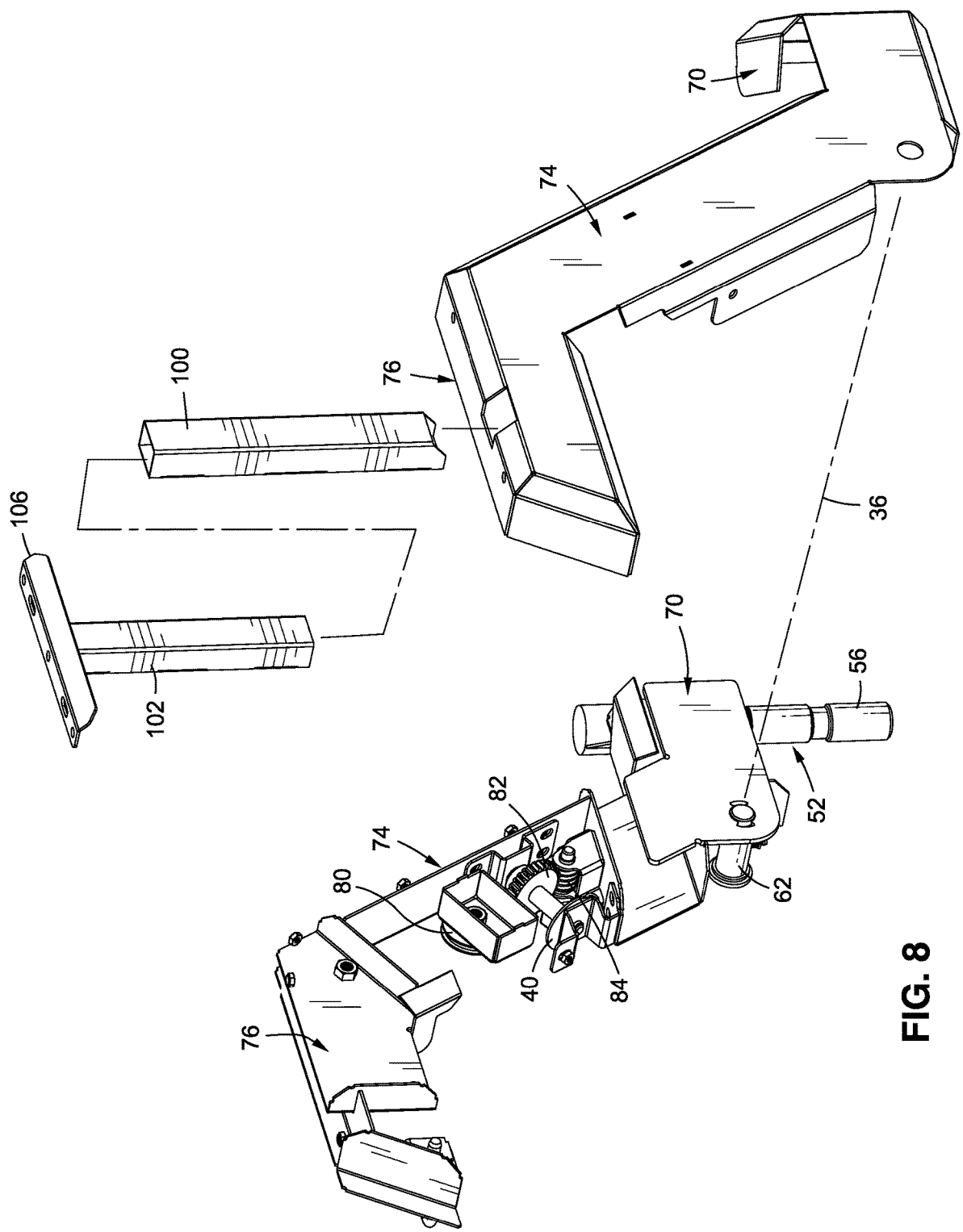
FIG. 8 is an exploded perspective view of the first support frame of the spare tire mount of FIG. 1.

The reel 40 is mounted to the middle portion 74, preferably so the flexible, elongated member 38 wound around the reel leaves the reel in a direction along a length of the middle portion 74. One or more pulleys 80 are used to change the direction of the flexible, elongated member 38. The reel 40 comprises a cylindrical core with a disk at opposing ends to keep the flexible, elongated member 38 from sliding off the ends of the cylindrical core. Advantageously, one of the disks 82 comprises a circular gear and more preferably comprises a worm wheel engaging a worm screw 84 (FIG. 8). The worm screw 84 is connected to an engaging end 88 that preferably has a plurality of flats forming a wrenching surface suitable for engaging a manual rotating tool such as a spanner wrench, or engaging a power-driven tool such as a socket for a drill. The gear 82 and worm 84 are selected so that the expected weight or tension on flexible, elongated member 38 will not rotate the worm 84. The expected weight held by the elongated, flexible member 38 is about 100-200 pounds.

In the depicted embodiment, two pulleys 80 are used as shown in the figures, with the first pulley 80a located adjacent the center of the reel 40 to receive the flexible member 38 and bring it into the plane of the second pulley 80b located at the top of the first support frame 16, at the outer corner where the intermediate portion 74 joins the top portion 76. That location places the pulley 80b above the center of the tire 12 and its associated wheel.

The distal end of the elongated, flexible member 38 connects to an upper portion of the second support frame 18, preferably at rotatable connection 90. The connection 90 is shown as a U-shaped bracket having two parallel flanges on the outer distal edge of the second support frame 18 with a bolt passing through both flanges and through a loop in the end of the elongated, flexible member 38. The loop rotates around the bolt to provide a rotatable connection.

The connection 90 need not be a rotatable connection but a rotatable connection is preferred. As seen in the Figures, the intermediate portion 74 has an opening or slot 86 (FIG. 6) in the lower side wall that allows the elongated, flexible member 38 to move along a length of the intermediate portion as the second support frame 18 rotates about joint 62 and axis 36 to raise and lower the second frame and tire 12 relative to the first support frame 16.

Referring to FIGS. 2, 3 and 5, the distal end 76 of the first support frame 16 is also preferably a closed-box section with a rectangular cross-section, but may be open or have portions open for ease of access. The distal end 76 has one part of latch 34 fastened to the distal end. An inverted, U-shaped bracket is welded to the lower flange of the closed channel forming the distal end 76. The ends of the legs are preferable welded to the lower flange on opposing sides of an opening (preferably a slot) through the lower flange of the distal end 76. Aligned holes in each opposing leg allow the shaft of a releasable fastener 92 to extend through the opposing legs. A male latch projection 94 (FIG. 3) on the second support frame 18 extends through the opening in the distal end 76 and between the opposing legs. The projection 94 has a hole that aligns with the holes through the legs of the bracket of the latch 34 so the releasable fastener 92 may pass through the holes in the bracket and male projection 94 to releasably connect the projection 94 and second support frame 18 to the first support frame 16. Removing the releasable fastener 92 disconnects the parts and releases the latch 34. A spring-loaded detent on one of the releasable fastener 94 or latch 94 retains the releasable fastener 94 in the connected position with the latch 34. An enlarged handle 96 on one end of the releasable fastener 94 makes it easier to manually grab the handle and engage or disengage the releasable fastener while the detent prevents the fastener from accidentally disengaging during operation of the motor vehicle 14.

The use of a shaft or pin on the releasable fastener 92 passing through aligned holes in male and female latch parts 34, 94 is preferred because of the positive latching and large load carrying capability of the design. But instead of connecting the parts together with a releasable pinned connection, or a releasable bolted connection, other types of releasable latch mechanism may be used to releasably connect the first and second support frames 16, 18, including hook and catch latches and spring actuated latches. Positive latch mechanisms that resist opening under vibration and movement of the mating latch parts are preferred.

Referring to FIGS. 1-6 and especially FIG. 8, an adjustable length tube is connected to the first support frame 16. A tubular base 100, preferably having a non-circular cross-section with a plurality of flat sides, is connected to the distal end 76 of the first support frame 16. At least one extendable support 102 with a similar cross-sectional shape as the base fits inside the tubular base 100 in a telescoping manner. A releasable fastening mechanism 104 releasably fixes the position of the extendable support 102 relative to the base 100 so that the length of the base and extendable support 102 may be adjusted and then releasably fastened in place. The depicted adjustment mechanism uses a threaded stud or bolt welded to the inner extendable support 102 and extending through an elongated slot in the outer, tubular base 100, with a threaded nut or wingnut engaging the stud or bolt to releasably clamp the inner extendable support 102 to the outer base. Other releasable fastening mechanisms can be used, including a ball and detent mechanism, a plurality of separate, aligned holes in the nested tubes 100, 102 with a fastener extending through the aligned holes, an over-center clamp or other releasable connections.

The extendable support 102 moving into and out of base 100 provides an adjustable length tube that has a proximal end releasably connected to the base 100 and the distal end 76 of the first support frame 16, and has a distal end extending above the first support frame. A light mounting bracket 106 is provided on the upper, distal end of the extendible support 102 and has one or more holes and/or slots extending through the bracket so a rear brake light (or other lights and items) can be fastened to the light mounting bracket 106. The adjustable length support 102 allows the brake light or other items to be positioned above the tire 12 so other vehicles behind the motor vehicle 14 can see the brake light. Multiple nested tubes can be used as desired, but it is believed desirable to limit the maximum height of mounting bracket 106 to about the maximum height of the roof of the motor vehicle 14. Thus, the nested tubes 100, 102 (or others) are typically a few feet in length when extended.

Referring further to FIGS. 1-6 and 8, the second support frame 18 has a proximal end that is connected to the horizontally rotating joint 62 so the second support frame rotates vertically about joint 62 and horizontal axis 36 toward and away from the first support arm 16. Advantageously, the distal end of the base portion 70 forms a clevis joint receiving a pin passing through and encircled by the proximal end of the second support frame 18. The second support frame 18 has a middle portion 114 with an upper surface that preferably extends upward along the lower side or bottom side of the middle portion 74 of the first support frame. Thus, the middle portion or intermediate portion 114 extends from the horizontal joint 62 upward at an angle of about 45°-75° from the horizontal (45°-15° from vertical) and preferably at an angle of about 60° from the horizontal (30° from vertical) to track the angle at which the middle portion 74 is inclined. A distal end 116 extends horizontally from the upper end of the second support arm. Depending on the length of the middle portion 114, the distal end 116 may appear to extend laterally or horizontally from the majority of the length of the middle portion 114.

The adjacent sides of the middle portions 74, 114 of the first and second support frames face each other and preferably each have a straight, inclined surface separated by a short distance of a fraction of an inch, from the adjacent surface of the other middle portion. Likewise, the distal ends 76, 116 of the first and second support frames preferably each have a flat surface, preferably horizontal surfaces that face each other and are separated by a short distance of a fraction of an inch. Advantageously, a strip of compressible material 117 (FIG. 6), such as solid or tubular rubber or suitable elastomer, is fastened to one of the adjacent sides of the distal ends 76, 116 and may be fastened to one of the adjacent sides of the middle portions 74, 114. Thus, for example, a rubber strip may be fastened to the lower, downward facing side of the distal end 76, or a rubber strip may be fastened to the upper, upward facing side of the distal end 116, or a different rubber strip may be fastened to both.

A compressible rubber strip of material 117 (FIG. 6) between the facing sides of the inclined middle portions 74, 114 and/or the distal ends 76, 116 is believed desirable because it allows the second support frame 18 to be drawn tightly against the facing side(s) of the first support frame by the elongated flexible member 38. A resilient layer of material 117 between the facing parts prevents a hard stop that may overstress the flexible member 38, and helps avoid abrading damage to the abutting parts caused by relative movement between the first and second support frames 16, 18 as the rotate slightly about second axis 32.

A tire mount 118 is connected to the distal end 116 of the second support frame 18. The tire mount 118 preferably includes a vertical plate from which a plurality of bolts 120 extend, with the bolts located to engage the mounting holes of a vehicle wheel. The plate may be inclined slightly from the vertical. The bolts 120 are centered around and parallel to a second horizontal axis 122 that is preferably, but optionally, parallel to and offset from the first horizontal axis 36. Since the axes 36 and 122 are on the same part, the second support frame 18, the axes may remain parallel while the frame 18 rotates about the second vertical axis 32. The second support frame 18 is below the first support frame 18 and rotatable about the first horizontal 36 axis towards and away from the first support frame in a vertical plane orthogonal to the first horizontal axis 36.

The tire mount 118 is shown as a circular plate and is preferably sized to fit within the curved center of the wheel holding the tire 12. The tire mount 118 has a thickness sufficient to support the bolts 120 that hold the weight of the wheel and tire 12 mounted on the wheel. Typically, three to five bolts 120 are provided with lug nuts engaging the bolts 120 to releasably fasten the spare wheel and tire to the tire mount 118.

The tire mount 118 is preferably offset rearward from the plane of the second support frame 16 by a tire support 124 shown as a rectangular tube. The width of the tires 12 varies but may be 6-12. While the tire support 124 may be of fixed length, it is preferably of variable length to accommodate different widths of tires and wheels and allow them to be positioned close to the vertical plane through the second support frame 18.

Figure 7:
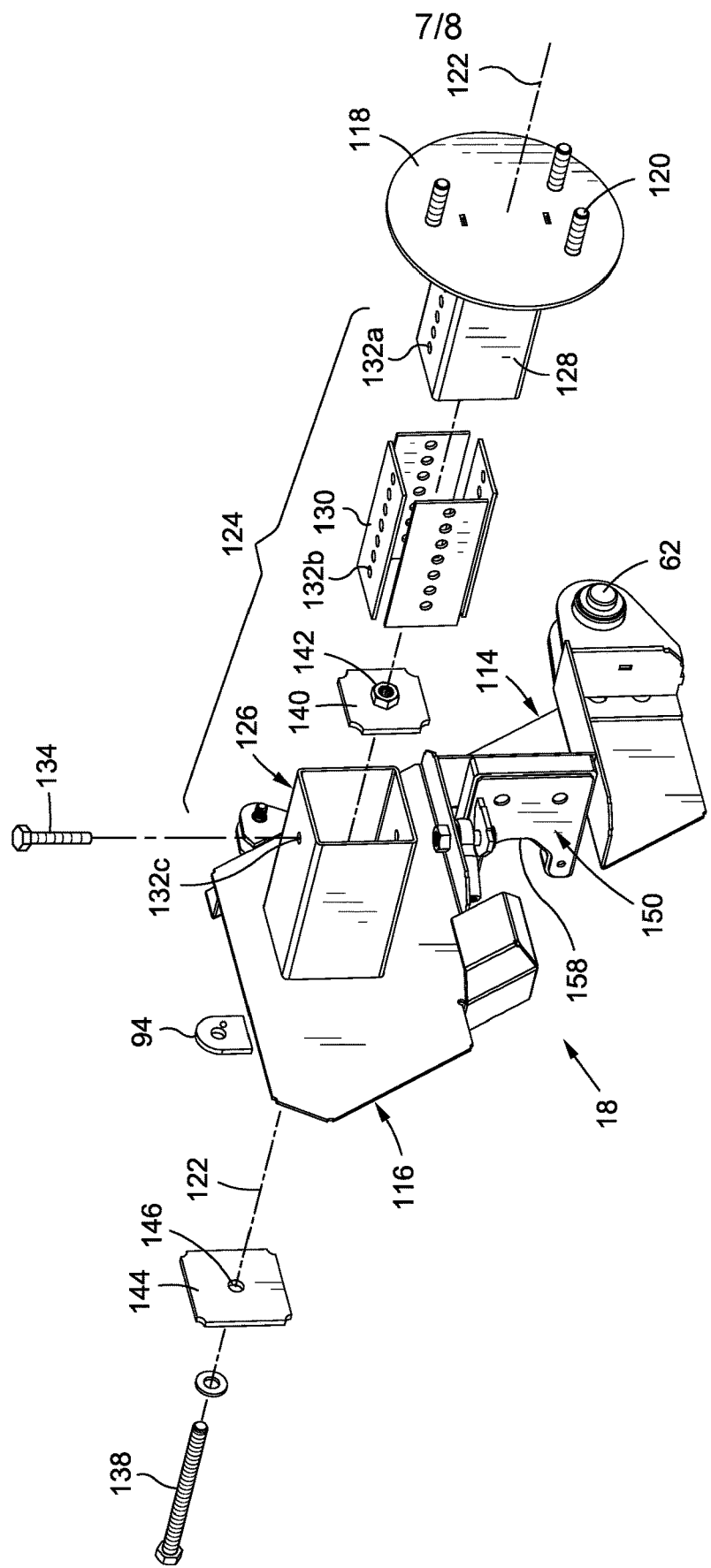
FIG. 7 is an exploded perspective view of the second support frame of the spare tire mount of FIG. 1.

Referring to FIGS. 1-7 and especially FIG. 7, the tire support 124 preferably has an outer tire support tube 126 fastened to the distal end 116 of the second support frame 18. The outer tire support tube 126 is preferably non-circular in shape and has a plurality of flat sides. A square cross-section is preferred. The tire mount 118 is fastened to the distal end of inner tire support tube 128 having a cross-sectional shape complimentary to that of the outer tire support tube 126 so the inner tube can nest inside of and slide relative to outer tube 126. A plurality of inserts 130 are interposed between the inner and outer tire support tubes 126, 128 to facilitate sliding of the inner tire support tube relative to the outer tire support tube. The sliding inserts 130 are preferably flat plates of ultra-high, molecular weight polymer material, but could comprise roller bearings or other bearings or slidable surfaces that can carry the cantilevered weight of the wheel and tire. Advantageously the inner and outer tire support tubes 126, 128 and the sliding inserts 130 are sized so the inner tire support tube 128 slides into and out of the outer support tube 126 in a snug fit, without a lot of movement in the plane orthogonal to the tire mount axis 122. A snug fit is desired and that includes a fit that requires manual force to move the tire mount 118 and inner tire support tube 128 relative to the outer tire support tube 132.

A series of holes 132a is formed the inner tire support tube 128 on opposing sides of the tube 128. A corresponding series of holes 132b is formed in the inserts 130 located on at least the corresponding sides that have the holes 132a so the holes can align. Uniformly spaced holes 132 are preferred. A pair of holes 132c are placed on opposing sides of the outer tire support 126 and located so they may be aligned with selected holes in the series of holes 132a and 132b. A removable locking fastener 134, such as a threaded bolt or the shaft of a pin or threaded fastener passes through aligned holes 132a, 132b, 132c to hold the parts in position once the desired position of tire mounting plate 118 is determined relative to the outer mounting tube 126 and second support frame 118. The holes in tire mounting tube 132c are shown as vertically aligned so that gravity will urged the head of locking fastener 134 against the outer tire mounting tube 126 and prevent the fastener from readily disengaging. The locking fastener 134 prevents relative movement of the tire mounting tubes 126, 128 and movement of tire mount 118 along axis 122, so preferably the opposing ends of the locking fastener 134 are prevented from unintentionally moving through the aligned holes 132a, 132b, 132c to disengage the parts. Various fasteners 134 may be used to restrain relative movement of the tubes 126, 128.

Referring to FIG. 7, the nested tubes 126, 128 form a telescoping, adjustable length tire mounting tube for the tire mount 118. The length may be more precisely controlled and held with a threaded fastener 138 connecting the inner tire support tube 128 to the second mounting frame 118. The proximal end of inner tire support tube 128 is preferably at least partially closed by a plate 140 having a threaded hole 142 which hole is on the axis 122 of the tire mount. The proximal end of the outer tire support tube 126 may also be at least partially closed by a plate 144 having a hole 146 located on the axis 122 of the tire mount. The threaded fastener 138 passes through the hole 146 and along axis 122 until the head of the threaded fastener 138 stops it. The threaded fastener 138 engages the threaded hole 142 on the inner tire support tube 128 and tightening of the fastener will draw the inner tire support tube 128 and tire mount 118 toward the second support frame 116. Loosening the threaded fastener 138 will allow the user to manually pull the tire mount 118 away from the second support frame. Thus, the position of the tire mount 118 and tire 12 may be adjusted. In use, the user loosens the fastener 138 until the tire is mounted on the tire mount 118 using lug nuts (not shown). The threaded fastener 138 is then tightened until the tire 12 abuts the first or second support frames 16, 18. As the tire is inflated with air and is compressible, the tire acts as a spring when it is drawn against the support frames 16, 18 and allows a resilient but tight connection between the tire and the support frames 16, 18 so as to avoid rattling noises.

Referring to FIGS. 1-5, in the first, stowed position the first and second support frames 16, 18 and tire 12 are held to the rear of the motor vehicle by the connecting link 22 with a brace 150 on one of the first or second support frames 16, 18 urged against a stop 152 on the motor vehicle to further stabilize the tire mounting system 10 on the motor vehicle 14. The back door 20 of the motor vehicle 14 has a panel 156 that is preferably recessed to contain a bracket 154 comprising two parallel flanges that are preferably horizontal. Each parallel flange on the bracket 154 has an aligned hole in each flange so the shaft of releasable connector 26 may pass through the holes. The rotatable joint 24 on the proximal end of connecting link 22 has a hole through it and fits between the two flanges. The shaft of the releasable connector 26 passes through the holes in the flanges of bracket 154 and through the hole in the rotatable end joint 24 of the connecting link 22 to fasten the proximal end of the connecting link 22 to the motor vehicle 14. The distal end of the connecting link 22 is connected to one of the first and second support frames 16, 18, preferably in substantially the same horizontal plane as the proximal end of the connecting link. Thus, removing the shaft of the releasable connector 26 disconnects the connecting link 22 from the vehicle. The recess in the panel 156 is believed to make it easier for a user to manually grip a handle or head of the releasable connector 26 to engage or disengage the connector and connecting link 22.

The stop 152 is shown as an L-shaped bar with the end of the short leg extending rearward from the rear of the vehicle and one side of the plate 156. The long leg of the L-shaped bar extends parallel to the rear door and over the recess in the plate 156. The stop 152, plate 156, connector 24 and connecting link 22 are preferably made of metal. The brace 150 is shown as extending forward toward the vehicle when in the stowed position, and is connected to the second support frame 18. The brace 150 preferably has a flat plate of HDMW plastic fastened to a metal bracket with the bracket bolted, welded or otherwise fastened to the second support frame 18, and with the UHMW plastic contacting the brace 150. The brace 150 preferably has a recess 158, preferably a C-shaped recess, configured to fit over a portion of the outer surface of the stop 152 and the brace 150 is located so it hits the stop when the tire 12 and support frames 16, 18 are in the first, stowed position. Preferably, the brace 152 has a portion extending horizontally over the recess in the plate 156 and the brace 158 extends parallel to a longitudinal an axis of the vehicle to engage the brace 152 when the spare tire 12 is in the stowed position.

As best seen in FIGS. 2-3, the distal end of connecting link 22 is fastened to the bottom side of the distal portion 116 of the second support frame 18, preferably by a vertical bolt through a rotatable joint so that both ends of the connecting link 22 may rotate and preferably with the connecting link 22 in a substantially horizontal plane. The connecting link 22 allows the rear door 20 (FIG. 1) of the motor vehicle 14 to open and close by rotating about the first hinge axis 28, without disconnecting and moving the first and second support frames 16, 18 which rotate about second hinge axis 32.

In the first, stowed position the recess 158 of the brace 150 abuts the stop 152 on the back door 20 of the motor vehicle 14 and the connecting link 22 is tightened so the recess 158 abuts the stop 152 along the longitudinal axis of the vehicle. The UHMW portion of the brace 150 helps dampen vibration between the abutting parts and provides a softer, wear surface for the stop 152 on the vehicle. Because the recess 158 of the brace 150 encircles part of the top and bottom of the stop 150, the brace helps limit vertical vibration of the first and second support frames 14, 16 and spare tire 12. Because the connecting link 22 can be tightened to pull the brace 150 against the stop 152, the brace helps limit forward motion of the first and second support frames 16, 18 and spare tire 12 while recess 158 limits vertical motion. Because the connecting link 22 extends between the rear door 20 and the second support frame 18 (preferably substantially in the same plane), the connecting link restrains forward and backward motion of the second support frame 18 and the spare tire 12. Because the first and second support frames 16, 18 are connected by the latch 34 and the horizontal joint 62, the connecting link 22 also helps stabilize forward and backward motion of the first support frame 16 as well as that of the second support frame 18.

The connecting link 22 is adjustable in length and can rotate at each end, so the distance of the first and second support frames from the back surface of the motor vehicle can be adjusted. A distance of a few inches is believed suitable, preferably about 1-5 inches. The further rearward the support frames 16, 18 and spare tire 12 get from the vehicle, the greater the force on the first, cantilevered, rotating joint 52. The distance set by the connecting link 22 is preferably sufficient to allow access by person's hand to insert and remove the releasable fastener 24 that connects the link 22 to the motor vehicle at the bracket 24. When disconnected from the vehicle 14, the link 22 moves with the second support frame. When the link 22 is connected to the second support frame 18 with a lateral or horizontal fastener, the link will usually hang downward if the first, proximal end is disconnected from the vehicle. Most of the figures show only the ends of the connecting link 22, but the adjustable length swivel link is known, having a shaft with a threaded connection to at least one of the rotatable ends 24 to vary the length.

In the first, stowed position, the rear brake lights for the motor vehicle 14 are connected to the mounting bracket 106, the position of which is adjusted using the extendable support bracket 102 and the releasable fastening mechanism 104 to locate the brake lights above the top side of the spare tire 12. In the first, stowed position, the weight of the spare tire and the first and second support frames 16, 18 is carried by the cantilevered rotating joint 52, which is connected to the vehicle mounting bracket 50 to the vehicle's frame and rear bumper 60. The connection to the rear bumper 60 is believed desirable because it connects to a different vehicle structure than the rotating joint 52, and connects in a different plane than the vertical plate of the bracket 50 that is bolted to the frame.

To move the spare tire 12 to the second, deployed position the releasable fastener 24 is removed to disengage the proximal end of the connecting link 22. It is possible to disengage the distal end of the connecting link 22 at the second movable frame 18. Once the link 22 is disengaged, the first and second support frames are manually rotated about the second vertical axis 32 and joint 52 to the second, deployed position. The latch 34 keeps the first and second support frames connected so they move as a unit and substantially restrains movement of the second support frame 18 relative to the first support frame when the latch is engaged, especially when the rotatable joint 62 connects to the lower end of the second support frame and also restrains motion of second frame 18 except for rotation about axis 36. The elongated flexible member 38 also helps keep the second support frame 18 immediately adjacent to the first support frame 16, although as the member 38 is primarily a tension member so it usually provides little restraint in a direction perpendicular to the member 38, especially when the first and second frames are separated from each other as in the third, deployed position. Depending on the configuration of the motor vehicle 14 and the location of the joint 52 and axis 32, the amount of possible rotation will vary as with enough rotation, the base 70 or other parts of the frames 16, 18 will hit the adjacent rear corner of the vehicle. An illustrative deployed position is shown in FIG. 2.

Once the support frames 16, 18 are rotated far enough from the vehicle to allow the spare tire 12 to be lowered without hitting the rear bumper 60, the handle 96 may be pulled to disengage the shaft (connected to the handle 96) from the aligned holes through the latch 34 and male projection 94 to decouple the first and second support frames. The tension on the elongated flexible member 38 may be adjusted slightly to loosen any binding force on the latch 34. Rotation of the engaging end 88 rotates worm screw 84 which rotates gear 82 to rotate the reel 40 and unwind the elongated flexible member 38 to rotate the second support frame about horizontal joint 62 to lower the second support frame and the spare tire 12 connected to that second frame. The engaging end 88 may be rotated manually with a hand operated tool or electrically, as with a drill and socket that engages the end 88. When the tire is on the ground or close thereto, the lug nuts on the bolts 120 that hold the wheel and tire to the wheel mount 118 are removed and the tire is removed.

The process to raise the empty tire mount 118 or a tire 12 fastened to the tire mount, is the reverse of the above sequence. Depending on the size of the tire, the position of the tire mount may be adjusted to bring it closer or further away from the second support frame—using the threaded fastener 138 (FIG. 7) to adjust the length of the telescoping tire support tubes 126, 128, with some possible pulling on the tire mount 118 to pull the mount outward, but using the fastener 138 to move the mount inward. The fastener 138 may be tightened as needed to pull the wheel and associated tire against one or both of the support frame(s) 16, 18.

The above described apparatus also provides an improved method of mounting a spare tire to the back of a motor vehicle. The method uses a first, outer support frame 16 rotating about a vertical axis 32 that is offset from a vertical axis about which a rear door of the vehicle rotates. The outer support frame 16 may rotate toward and away from the back of the vehicle about axis 32. The method uses a second, inner frame 18 that is rotatably mounted to the first support frame 16 at joint 62, to rotate in a vertical plane toward and away from the first frame and toward and away from the ground. The method uses a flexible member 38 extending between the first and second frames 16, 18 and which may be varied in length to vary the rotation of the second support frame 18 as it rotates about axis 36 when the frames are not restrained by the latch 34, 94. The method uses a releasable latch 34, 94 to releasably connect the first and second frames 16, 18 at a location spaced apart from the horizontal axis of rotation 36. The method uses releasable connecting link 22 and latch 34, 94 to tether the frames 16, 18 to the door 20 so the door and frames may rotate together about two separate axes of rotation, or to allow the frames 16, 18 and rear tire 12 to rotate independently of the rear door. The methods of using these various parts to move the frames 16, 18 and spare tire 12 to and between the first position, second position and third position, are described above, and are not be repeated in detail.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The above description is given by way of example, and not limitation. Given the above disclosure, one skilled in the art could devise variations that are within the scope and spirit of the invention, including various ways of releasably fastening the connecting link 22 to the vehicle and support frames 16, 18, various ways of releasably connecting the first and second support frames other than the described latch 34, and various ways of adjusting the length of the telescoping tire support tubes 126, 128 and the telescoping extension tube 100. Further, the various features of this invention can be used alone, or in varying combinations with each other and are not intended to be limited to the specific combination described herein. Thus, the invention is not to be limited by the illustrated embodiments.

What is claimed is:

1. A spare tire mounting mechanism for the rear of a motor vehicle having a rear door hinged at a first side of the vehicle to rotate about a first vertical axis, the spare tire mounting mechanism comprising:
    a first support frame having proximal and distal ends with a base rotating about a second vertical axis at the proximal end, the second vertical axis being laterally offset from the first vertical axis during use;
    a second support frame having proximal and distal ends with its proximal end rotatably connected to the first support frame to rotate about a first horizontal axis, the distal end of the second support frame having a tire mount for the spare tire, the second support frame rotating between a first, stowed position higher than the proximal end of the base, and a second, deployed position with the spare tire below the proximal end of the base when measured in the vertical plane;
    a releasable connection between the first and second support frames, operable when the second support frame is in the stowed position; and
    further comprising a vehicle mounting bracket having at least one vertical plate with a plurality of bolt holes therethrough and further having a top mounting plate with at least one vertical bolt hole therethrough, the vehicle mounting bracket receiving and holding the steel pin and the at least one bushing and at least one thrust bearing.

2. A spare tire mounting mechanism for the rear of a motor vehicle having a rear door hinged at a first side of the vehicle to rotate about a first vertical axis, the spare tire mounting mechanism comprising:
    a first outer support frame and a second, inner support frame nested inside, the first support frame connected to a first joint and rotating about a second vertical axis during use, the second support frame connected to a horizontal joint connected to a base of the first support frame so the second support frame rotates about a first horizontal axis between a stowed position and a deployed position with a releasable latch mechanism releasably connecting the first and second support frames in the stowed position;
    an adjustable length swivel link having a first end connected to one of the first and second support frames and a second end configured to receive a shaft to connect the link to the motor vehicle during use, the first and second ends of the swivel link comprising multi-axis rotation joints;
    a reel mounted to the first support frame, the reel having an elongated member wound around the reel with a distal end of the elongated member fastened to the second support frame;
    a tire mount is connected to the second support frame;
    wherein when the releasable latch is latched the first and second support frames may rotate together about the first vertical axis;

wherein when the releasable latch is unlatched the reel may rotate to unwind the elongated member and the second support frame and tire mount may rotate about the first horizontal axis away from the first support frame and toward the ground.

3. The spare tire mounting mechanism of claim 2, further comprising a brace extending from the second support frame and having a recess configured to receive a mating stop on the motor vehicle during use.

4. The spare tire mounting mechanism of claim 2, further comprising an upwardly extending, adjustable length tube having a proximal tube end connected to the first support frame and a distal tube end having a mounting surface having at least one hole to mount a rear brake light of the motor vehicle during use.

5. The spare tire mounting mechanism of claim 2, wherein the first joint comprises a steel pin held by at least one bushing and at least one thrust bearing.

6. The spare tire mounting mechanism of claim 5, further comprising a vehicle mounting bracket having at least one vertical plate with a plurality of bolt holes therethrough and further having a top mounting plate with at least one vertical bolt hole therethrough, the vehicle mounting bracket receiving and holding the steel pin and the at least one bushing and at least one thrust bearing.

* * * * *